United States Patent [19]

Someya et al.

[11] Patent Number: 5,109,173
[45] Date of Patent: Apr. 28, 1992

[54] ROTOR INSULATING CORE FOR MINIATURE MOTORS

[75] Inventors: Ryouichi Someya; Masakazu Ikegami, both of Matsudo, Japan

[73] Assignee: Mabuchi Motor Co., Ltd., Chiba, Japan

[21] Appl. No.: 661,055

[22] Filed: Feb. 25, 1991

[30] Foreign Application Priority Data

Feb. 27, 1990 [JP] Japan .................................. 2-46792

[51] Int. Cl.$^5$ ............................................. H02K 1/22
[52] U.S. Cl. ................................... 310/261; 310/216; 310/40 MM
[58] Field of Search ............... 310/261, 216, 214, 215, 310/179, 42, 40 MM

[56] References Cited

U.S. PATENT DOCUMENTS

| | | | |
|---|---|---|---|
| 2,469,100 | 5/1949 | Andrus | 310/215 |
| 3,209,992 | 10/1965 | Christiansen | 310/261 |
| 4,400,639 | 8/1983 | Kobayashi et al. | 310/215 |
| 4,486,506 | 12/1984 | Kenjo et al. | 310/215 |
| 4,876,473 | 10/1989 | Tanaka et al. | 310/261 |

*Primary Examiner*—Steven L. Stephan
*Assistant Examiner*—E. To
*Attorney, Agent, or Firm*—McGlew & Tuttle

[57] ABSTRACT

A rotor insulating core for miniature motors comprising a stator having a field-forming permanent magnet, a rotor having a rotor winding wound on a rotor core fixedly fitted to a motor shaft; an insulating core being disposed on the surface of the rotor core; and the rotor winding being wound on the rotor core via the insulating core, in which the insulating core consists of an insulating end-face portion covering the end face of the rotor core and an insulating rib covering the side of the rotor core; both being integrally formed; the insulating rib is formed in such a fashion as to have a thickness smaller than the insulating end-face portion and a predetermined length, and disposed in such a manner as to cover the rotor core on which the rotor winding is wound.

6 Claims, 3 Drawing Sheets

FIG. IA
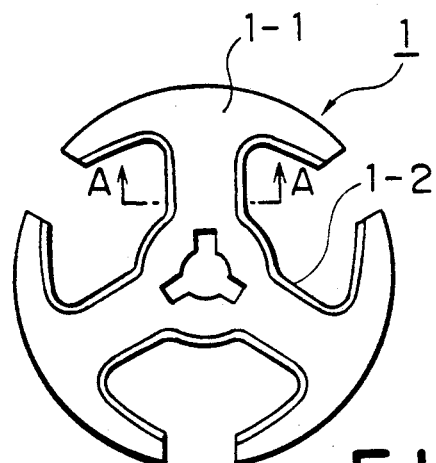
FIG. IB
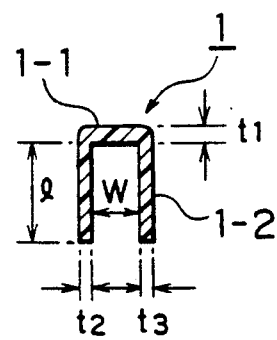
FIG. 2
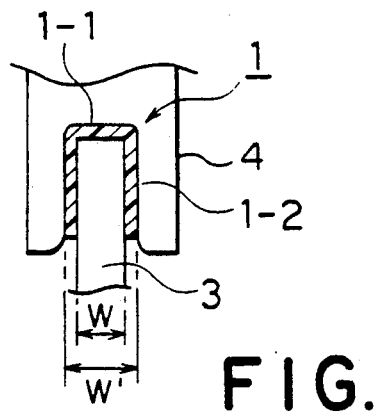
FIG. 3A
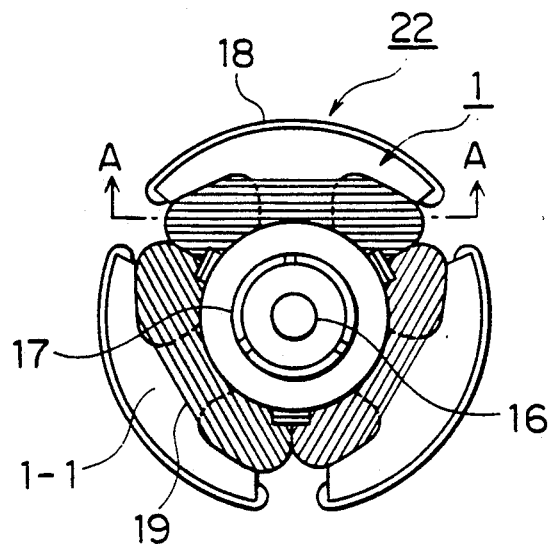
FIG. 3B
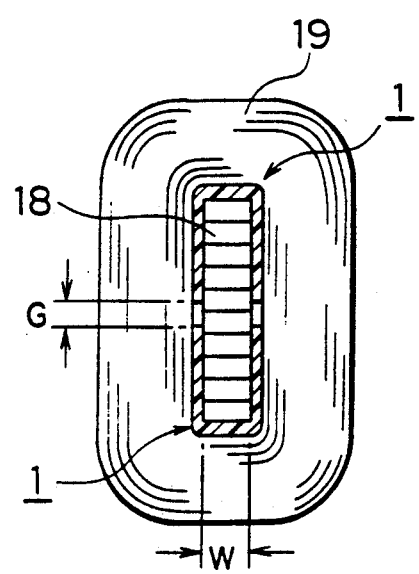

ROTOR INSULATING CORE FOR MINIATURE MOTORS

BACKGROUND OF THE INVENTION

This invention relates generally to a rotor insulating core for miniature motors, and more particularly to a rotor insulating core for miniature motors adapted to improve the winding space factor and insulating performance of the rotor winding.

DESCRIPTION OF THE PRIOR ART

FIG. 6 illustrates a miniature motor, to which this invention is applied, having essentially the same construction as conventional miniature motors. That is, a brush 13 is integrally formed with a terminal 12 supported by a small case 11. The brush 13 makes contact with a commutator 17. A motor shaft 16 is supported by bearings 14 and 15. The commutator 17 and a rotor core 18 are mounted on the motor shaft 16. Current is fed to a rotor winding 19 wound on the rotor core 18 via the terminal 12, the brush 13 and the commutator 17. A miniature motor rotor 22 is caused to rotate by the current flowing in the rotor winding 19 and a permanent magnet 21 fixedly fitted to the inner circumferential surface of a large case 20.

In a miniature motor as shown in FIG. 6, an iron core comprising the rotor core 18 is made of laminated silicon steel sheets, for example. Consequently, an insulating core 23 is interposed between the rotor core 18 and the rotor winding 19, as shown in FIG. 7. FIG. 7(A) is a front view of the rotor 22, as viewed in the direction shown by an arrow in FIG. 6, and FIG. 7(B) is a cross-sectional view taken along line A—A in FIG. 7 (A).

In the conventional miniature motor shown in FIG. 7, the insulating core 23 has a shape corresponding to the shape of the end face of the rotor core 18 in the direction of the motor shaft 16, with the side edge 23-1 thereof bent by stamping, for example, in such a direction as to extend along the side of the rotor core 18. The rotor winding 19 is wound on the rotor 22 in such a state where the insulating core 23 is disposed at both ends of the rotor core 18, as shown in FIG. 7(B). That is, the rotor 22 has such a construction that electrical insulation between the rotor core 18 and the rotor winding 19 is ensured by preventing the rotor winding 19 from coming in direct contact with the rotor core 18.

As described above, the side edge 23-1 of the insulating core 23 in the conventional miniature motor shown in FIG. 7 is bent at essentially right angles by stamping. The side edge 23-1 of the insulating core 23 should preferably be kept in close contact with the rotor core. In press working the insulating core, however, the clearance between the die and punch (not shown) is set to the same size as the thickness of the material of the insulating core 23. This causes the bending angle of the side edge 23-1 of the insulating core 23 to be larger than the right angle due to the springback of the material. As a result, the winding space factor of the rotor winding 19 wound on the insulating core 23 tends to be unwantedly lowered due to a space 24 existing between the rotor winding 19 and the rotor core 18, as shown in FIG. 7(B). The lowered winding space factor leads to the limited number of winding turns.

In the conventional miniature motor shown in FIG. 7, the force exerted on the side edge 23-1 of the insulating core 23 varies from the beginning of winding to the state where the force caused at one turn of winding is accumulated as the winding of the rotor winding 19 proceeds. Consequently, as winding operation proceeds from the initial state, the bending angle of the side edge 23-1 of the insulating core 23 becomes gradually smaller. That is, the space 24 between the rotor winding 19 and the rotor core 18 is gradually changed from the state shown in FIG. 7(B) at the initial stage of winding to the state shown in FIG. 8 as the rotor winding 19 is forced toward the rotor core 18 to the extent that the rotor winding 19 eventually comes in contact with the rotor core 18. As a result, the vibration caused by the rotation of the rotor 22 causes the rotor winding 19 and the rotor core 18 to be in constant friction with each other, causing damage to the insulation coating of the rotor winding 19. This could lead to an unwanted problem of leakage.

SUMMARY OF THE INVENTION

This invention is intended to overcome the aforementioned problems. To achieve this objective, the rotor insulating core for miniature motors of this invention comprises a stator having a field-forming permanent magnet, a rotor having a rotor winding wound on a rotor core fixedly fitted to a motor and an insulating core being disposed on the surface of the rotor core. The rotor winding being wound on the rotor core via the insulating core. The insulating core consists of an insulating end-face portion covering the end face of the rotor core and an insulating rib covering the side of the rotor core; both being integrally formed. The insulating rib is formed by ironing, for example, a substantially flat section of insulating material in such a fashion as to have a thickness smaller than the insulating end-face portion and a predetermined length, and disposed in such a manner as to cover the rotor core on which the rotor winding is wound.

These and other objects of this invention will become more apparent by reference to the description, taken in connection with the accompanying FIGS. 1 through 5.

BRIEF DESCRIPTION OF THE DRAWING

FIG. 1A is a view of the axial end of the rotor core;

FIG. 1B is a cross sectional view of the insulating core;

FIG. 2 is a diagram of explaining the press working of the insulating rib of the insulating core according to the invention.

FIG. 3A is a view of the axial end of the rotor core containing the windings;

FIG. 3B is a view taken along the line A—A in FIG. 3A;

DETAILED DESCRIPTION OF THE EMBODIMENT

Figure 4A:
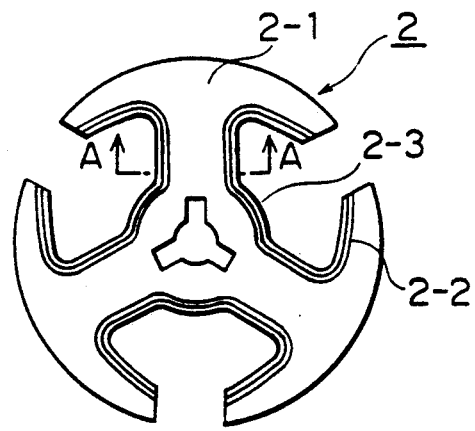
FIG. 4 is a diagram of assistance in explaining another embodiment of this invention.

In the following, an embodiment of this invention will be described, referring to FIGS. 1(A) and (B).

In FIG. 1, (A) is a plan view of an insulating core in a rotor, and (B) is a cross-sectional view taken along line A—A in (A). Reference numeral 1 in the figure refers to an insulating core; 1-1 to an insulating end-face portion; and 1-2 to an insulating rib, respectively.

Figure 6:
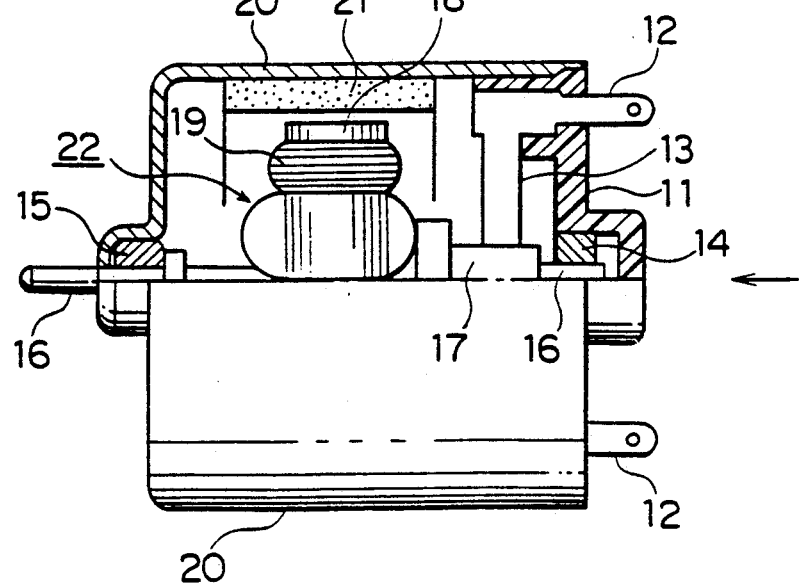
FIG. 6 is a front view of a miniature motor utilizing the rotor insulating core.

The insulating core 1 shown in FIG. 1 consists of the insulating end-face portion 1-1 and the insulating rib 1-2. The insulating end-face portion 1-1 has a shape essentially corresponding to the shape of the end face or axial end, in the direction of the motor shaft 16 of the rotor core 18 of the miniature motor (shown in FIG. 6) to which this invention is applied. The insulating rib 1-2 is formed by ironing, which will be described later in connection with FIG. 2. The thickness $t_1$ of the insulating end-face portion 1-1 is essentially the same as the thickness of the original insulating material. The insulating rib 1-2 is formed by ironing so that the thicknesses $t_2$ and $t_3$ of the insulating rib 1-2 become about 20 to 85% of $t_1$. The reason why the thicknesses $t_2$ and $t_3$ are made 20 to 85% of $t_1$ is as follows: Making $t_2$ and $t_3$ smaller than 20% of $t_1$ would reduce the mechanical strength, deteriorating insulating performance, while making $t_2$ and $t_3$ larger than 80% of $t_1$ would cause springback, deteriorating winding space factor. The groove width W between the insulating ribs 1-2 corresponds to the width W (as shown in FIG. 3) of the axial end the rotor core 18, and the length 1 of the insulating rib 1-2 may be an appropriate length and need not be a length sufficient to cover the overall or longitudinal side surface of the rotor core 18.

Next, ironing for forming the insulating rib 1-2 of the insulating core 1 will be described with reference to FIG. 2. Ironing is accomplished using a punch 3 having a thickness W, that is, the same size as the groove width W of the insulating ribs 1-2, and a die 4 having a groove width W', that is substantially equal to $W' = W + T_2 + T_3$. The insulating core 1 shown in FIG. 1 is formed by the aforementioned ironing.

The rotor core 18 is covered from both sides thereof with the insulating core 1 formed in the aforementioned manner, on which the rotor winding 19 is wound.

In the foregoing, the embodiment shown in FIG. 1 has been described. The rotor of a miniature motor to which the embodiment shown in FIG. 1 is applied is shown in FIG. 3. FIG. 3(A) is a front view of the rotor viewed in the direction of the motor shaft, and FIG. 3(B) is a cross-sectional view taken along line A—A in FIG. 3(A).

Figure 7A:
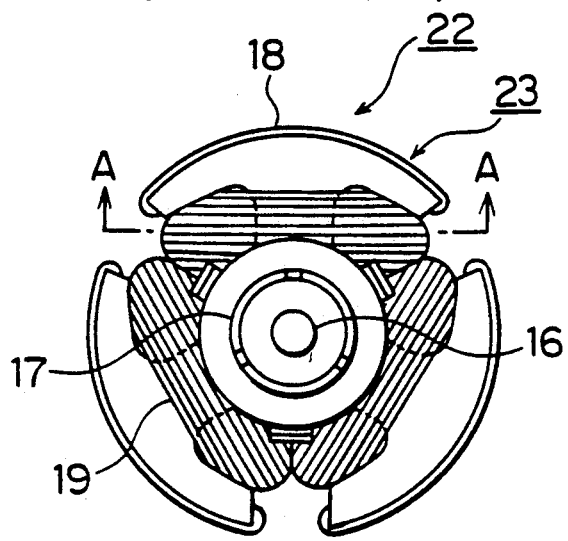
FIG. 7a is an end view of a conventional miniature motor.
Figure 7B:
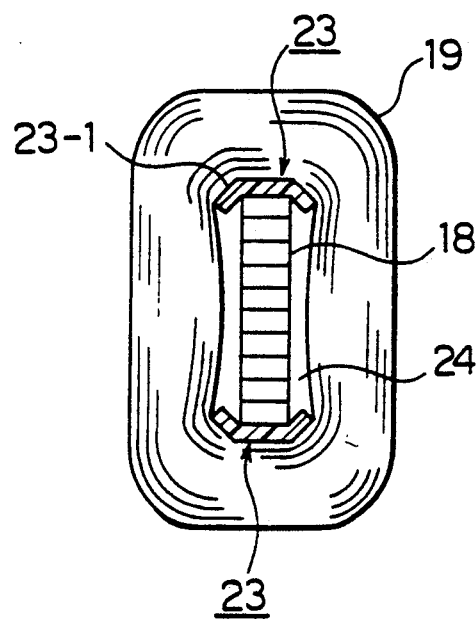
FIG. 7b is a side view of a conventional miniature motor.
Figure 8:
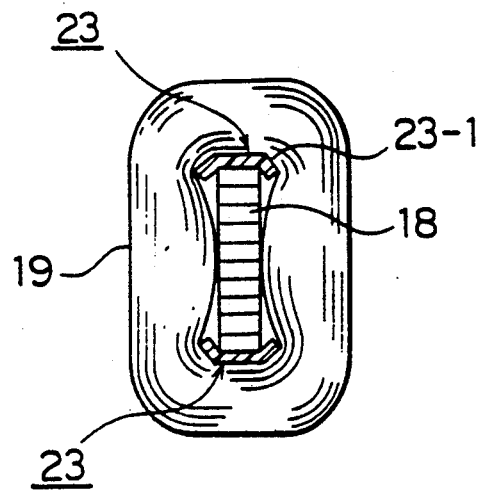
FIG. 8 is a side view of a conventional miniature motor showing the rotor winding in contact with the rotor core.

In the figures, like numerals correspond to like parts in FIGS. 1 and 7.

In the embodiment shown in FIG. 3, a rotor 22 in which the insulating core 1 described with reference to FIG. 1 is disposed on both end faces of the rotor core 18, and the rotor winding 19 is wound on the insulating core is shown.

As shown in FIG. 3(B), the springback as described at the beginning of this Specification does not occur in the state where the rotor winding 19 is wound on the rotor core 18 because the insulating end-face portion 1-1 and the insulating rib 1-2 of the insulating core 1 come in close contact with the rotor core 18 and the thickness $t_2$ of the insulating rib 1-2 is made smaller than the thickness $t_1$. Furthermore, electrical insulating performance is not deteriorated since the thickness $t_2$ of the insulating rib 1-2 is made smaller than the thickness $t_1$ of the insulating end-face portion 1-1 by ironing. Thus, the winding space factor and insulating performance of the rotor winding 19 can be improved. If the gap G between the tips of the rotor core 18 is reduced by appropriately setting the length 1 of the insulating rib 1-2 as described in connection with FIG. 1(B), the rotor core 18 can be substantially covered by the insulating core 1, making the insulation between the rotor winding 19 and the rotor core 18 more positive.

FIG. 4 is a diagram of assistance in explaining another embodiment of this invention.

Figure 4B:
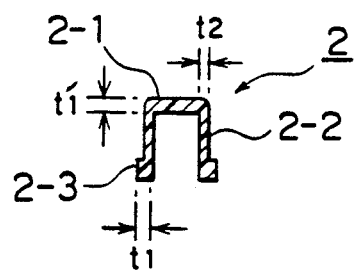

FIG. 4(A) is a plan view, and FIG. 4(B) is a cross-sectional view taken along line A—A shown in FIG. 4(A). Numeral 2 in the figures refers to an insulating core; 2-1 to an insulating end-face portion; 2-2 to an insulating rib; and 2-3 to a rib tip, respectively.

The insulating core shown in FIG. 4 has a rib tip 2-3 formed at the tip of the insulating rib 2-2. The embodiment shown in FIG. 4 has essentially the same construction as the embodiment shown in FIG. 1, and is formed in the same machining method. That is, the insulating core 2 is formed by ironing as in the case of the embodiment shown in FIG. 1, with the rib tip 2-3 2-3 left intact. As a result, the thickness of the rib tip 2-3 is formed into the same thickness as the thickness $t_1$ (the thickness of the material) of the insulating end-face portion 1-1.

Figure 5A:
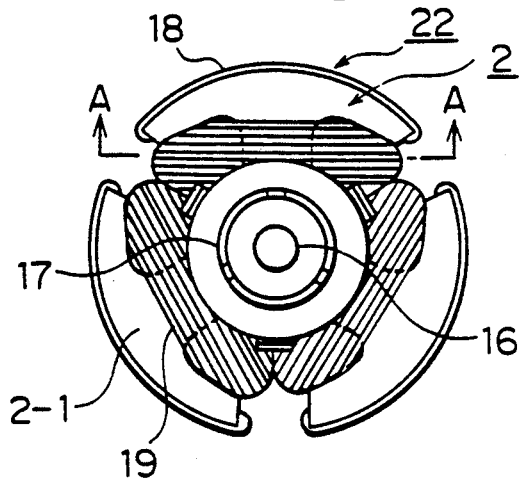
FIGS. 5(A) and (B) are diagrams of assistance in explaining an example to which the embodiment shown in FIG. 4 is applied.
Figure 5B:
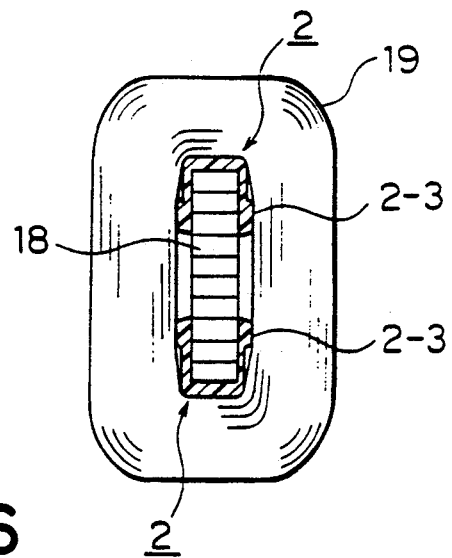

FIG. 5 shows the rotor of a miniature motor to which the embodiment shown in FIG. 4 is applied. FIG. 5(A) is a front view of the rotor viewed from the direction of the motor shaft, and FIG. 5(B) is a cross-sectional view taken along line A—A in FIG. 5(A). Like numerals in the figures correspond to like parts shown in FIGS. 3 and 4.

In the embodiment shown in FIG. 5, the aforementioned insulating core 2 shown in FIG. 4 is disposed on both end faces of the rotor core 18, as in the case of the embodiment shown in FIG. 3, and then the rotor winding 19 is wound on the rotor core 18. The state in which the rotor winding 19 is wound on the rotor core 18 is shown in FIG. 5(B). That is, the springback as described at the beginning of this Specification does not occur because the insulating end-face portion 2-1, insulating rib 2-2 and rib tip 2-3 of the insulating core 2 come in close contact with the rotor core 18, and the thickness $t_2$ of the insulating rib 2-2 is made smaller than the thickness $t_1$ of the insulating end-face portion.

Thus, the winding space factor and insulating performance of the rotor winding 19 can be improved.

Furthermore, a groove can be provided at the bent portion of the insulating core 1 on the opposite side to the bending direction, though not shown in the figure. The groove helps prevent the springback of the insulating core 1, improve the winding space factor of the rotor winding 19, and prevent the insulating performance of the insulating core 1 from deteriorating.

In the above embodiments, the insulating core is formed by ironing, but the insulating core may be formed by integral molding using an injection molding machine.

As described above, this invention makes it possible to improve the winding space factor and insulating performance of the rotor winding since the insulating rib of the insulating core is ironed to reduce the thickness thereof, and the portion of the rotor core on which the rotor winding is wound is covered with the insulating rib.

What is claimed:

1. A rotor insulating core for miniature motors comprising:
   a stator having a field-forming permanent magnet;
   a rotor having a rotor winding wound on a rotor core fixedly fitted to a motor shaft; an insulating core being disposed on a surface of said rotor core; said rotor winding being wound on said rotor core via said insulating core, in which said insulating core consists of an insulating end-face portion covering the whole of the end face of said rotor core and an insulating rib covering a longitudinal side of said rotor core, said insulating end-face and said insulating rib both being integrally formed; said insulating rib is formed to have a thickness smaller than a thickness of said insulating end-face portion and a predetermined length, and disposed in such a manner as to cover said rotor core on which said rotor winding is wound.

2. A rotor insulating core for miniature motors as set forth in claim 1 wherein said insulating rib of said insulating core is formed to have a thickness smaller than said insulating end-face portion by injection molding.

3. A rotor for an electric motor in which the rotor comprises:
   a motor shaft;
   a rotor core mounted on said motor shaft, said rotor core having axial ends and longitudinal sides;
   an insulating core disposed on said rotor core, said insulated core having an insulating end-face portion and an insulating rib, both said insulating end-face portion and said insulating rib being integrally formed, said insulating rib having a thickness thinner than a thickness of said insulating end-face portion, said insulating core fitting over one of said axial ends and said insulating rib being in full contact with said longitudinal sides of said rotor core.

4. A rotor in accordance with claim 3, wherein:
   said thickness of said insulating rib is 20% to 85% of said thickness of said insulating end-face portion.

5. A rotor in accordance with claim 3, wherein:
   said insulating core is formed by a punch and die method using a substantially flat section of insulating material, said punch having a width substantially equal to a width of said axial end, and said die having a groove width that is substantially equal to said width of said axial end plus a width of said axial rib in order for said thickness of said insulating rib to be thinner than said thickness of said insulating end-faced portion.

6. A rotor in accordance with claim 5, wherein:
   said insulating core has another insulating rib and said groove width of said die is substantially equal to said width of said axial end plus said width of said insulating rib plus a width of said another insulating rib.

* * * * *